United States Patent [19]
Lakey et al.

[11] Patent Number: 6,078,954
[45] Date of Patent: Jun. 20, 2000

[54] SERVER DIRECTED MULTICAST COMMUNICATION METHOD AND SYSTEM

[75] Inventors: Jeremy A. Lakey, Tulsa; Douglas Naufel, Broken Arrow, both of Okla.

[73] Assignee: Williams Communications, Inc., Tulsa, Okla.

[21] Appl. No.: 09/084,758

[22] Filed: May 26, 1998

[51] Int. Cl.$^7$ .................................................... G06F 13/00
[52] U.S. Cl. ........................... 709/223; 709/223; 709/237
[58] Field of Search ...................... 709/203, 219, 709/220, 223, 224, 225, 230, 237, 238, 242, 250, 313, 328; 370/400, 409

[56] References Cited

U.S. PATENT DOCUMENTS

| | | |
|---|---|---|
| Re. 33,559 | 3/1991 | Fallacaro et al. . |
| 2,911,462 | 11/1959 | Brady . |
| 3,401,469 | 9/1968 | Shaver . |
| 3,795,771 | 3/1974 | Gundersen et al. . |
| 4,496,148 | 1/1985 | Mortstain et al. . |
| 4,553,222 | 11/1985 | Kurland et al. . |
| 4,584,603 | 4/1986 | Harrison . |
| 4,684,980 | 8/1987 | Rast . |
| 4,771,344 | 9/1988 | Fallacaro et al. . |
| 4,835,604 | 5/1989 | Kondon et al. . |
| 4,866,515 | 9/1989 | Tagawa et al. . |
| 4,958,381 | 9/1990 | Toyoshima . |
| 5,013,038 | 5/1991 | Luxenberg et al. . |
| 5,027,400 | 6/1991 | Baji et al. . |
| 5,057,915 | 10/1991 | Von Kohorn . |
| 5,247,347 | 9/1993 | Litteral et al. . |
| 5,253,341 | 10/1993 | Rozmanith et al. . |
| 5,289,272 | 2/1994 | Rabowsky et al. . |
| 5,311,302 | 5/1994 | Berry et al. . |
| 5,326,104 | 7/1994 | Pease et al. . |
| 5,517,494 | 5/1996 | Green . |
| 5,524,272 | 6/1996 | Podowski et al. . |
| 5,526,035 | 6/1996 | Lappington et al. . |
| 5,541,638 | 7/1996 | Story . |
| 5,555,466 | 9/1996 | Scribner et al. . |
| 5,561,670 | 10/1996 | Hoffert et al. . |
| 5,568,484 | 10/1996 | Margis . |
| 5,589,892 | 12/1996 | Knee et al. . |
| 5,592,657 | 1/1997 | Johnson et al. . |
| 5,608,447 | 3/1997 | Farry et al. . |
| 5,610,822 | 3/1997 | Murphy . |
| 5,612,730 | 3/1997 | Lewis . |
| 5,612,959 | 3/1997 | Takase et al. ........................... 370/390 |
| 5,617,539 | 4/1997 | Ludwig et al. . |
| 5,642,155 | 6/1997 | Cheng . |
| 5,666,291 | 9/1997 | Scott et al. . |
| 5,689,637 | 11/1997 | Johnson et al. . |
| 5,696,763 | 12/1997 | Gang, Jr. . |
| 5,701,451 | 12/1997 | Rogers et al. . |
| 5,727,002 | 3/1998 | Miller . |
| 5,745,159 | 4/1998 | Wax et al. . |
| 5,745,880 | 4/1998 | Strothmann . |
| 5,778,187 | 7/1998 | Monteiro et al. ........................ 709/231 |
| 5,940,391 | 8/1999 | Malkin et al ........................... 370/390 |
| 5,968,126 | 10/1999 | Ekstrom et al. ........................ 709/225 |

FOREIGN PATENT DOCUMENTS

| | | |
|---|---|---|
| 2021458 | 1/1992 | Canada . |
| 1493709 | 11/1977 | United Kingdom . |
| 2161629A | 1/1986 | United Kingdom . |

*Primary Examiner*—Viet D. Vu
*Attorney, Agent, or Firm*—Head, Johnson & Kachigian

[57] ABSTRACT

A method and system of implementing a multicast protocol in a data network capable of basic internet protocol data traffic which provides a medium for data transfer. By illustration the data network comprises a server system and a plurality of clients connected to the server by way of a common network. This method and system manages the assignment of multicast addresses for each client and places each client into specific multicast groups based upon their multicast addresses. This method and system is then able to transfer multicast packets to individual clients based upon their multicast addresses.

13 Claims, 4 Drawing Sheets

SERVER DIRECTED MULTICAST COMMUNICATION METHOD AND SYSTEM

BACKGROUND OF THE INVENTION

1. Field of the Invention

The present invention relates generally to the transfer of data in a client\server computer network. More specifically, the present invention relates to the implementing of a multicast protocol in a network, such as a computer network.

2. Prior Art

In order to transmit data over a network an effective transfer scheme for sending and receiving the data is required. Most networks support three basic transfer schemes, a unicast addressing scheme, where the data is sent to one unique device on the data network, a broadcast addressing scheme where data is sent to all devices on the data network and a multicast addressing scheme where data is sent to a group of devices on the data network. Each type of addressing scheme has characteristics that are both desirable and undesirable. The unicast addressing scheme works well in a network system where only one device or client receives data from the data network. If there is a requirement that multiple clients receive data, then the source device or server has to retransmit the data to each additional client. As a number of additional clients increases, the data network quickly becomes over loaded and congested.

The broadcast addressing scheme permits multiple clients to receive the data without requiring the server to transmit multiple sets of data. The broadcast data, however, is also transmitted to clients that are not interested in the data. These clients have to receive the data and reject it. Thus the broadcast of data onto data network affects other clients on the data network.

The multicast addressing scheme enables the transmission of data to be received by a select group of clients on the data network system. Clients typically communicate with the server and request to be added to a specific group of clients in order to receive data that is transferred to that specific group. Thus, a multicast addressing scheme is suitable for the selective transmission of data.

The traditional multicast scheme operates in a manner in which a specific client requests the server to place that client in a specific group so that the client can receive that groups specific data or multicast packets. Typically, the server has no control over which clients are placed within which group.

There remains a need for a method and system which allows for the server to have control over which clients are to be placed within which multicast group.

Therefore, it is desirable to design a client\server network capable of allowing the server to assign clients to specific multicast groups in order to receive specific multicast packets.

SUMMARY OF THE INVENTION

In accordance with the present invention, a multicast communication system utilizing a client\server network capable of allowing the server to assign each client to specific multicast groups in order to receive specific multicast packets is disclosed. The server, being coupled to a common network, sends or transmits packets, such as configure, control and maintenance packets to a specific multicast group of clients via the common network. A plurality of clients, with each client being coupled to the common network, receives the packets from the common network if the client is assigned to the specific target multicast group. The configure packets include instructions pertaining to the configuration of the client. The control packet includes information pertaining to the control of the client. Maintenance packet includes instructions pertaining to the status and maintenance of the client.

Generally, the operation of the present invention involves the following steps. Assign a client to a specific multicast group or groups, notifying the client as to which multicast group or groups it has been assigned and executing actions over the network.

Assigning a client to a specific multicast group involves the following steps. When a client is activated, it notifies the server of its active status. The client then waits for a response from the server. The server receives the notification from the client and queries a database containing specific information related to that client. The database returns the requested information about the specific client to the server. The server processes the information received from the database and assigns the client to specific groups based upon the information received from the database.

In the event there are no records contained in the database for a specific client, the database returns such a notification to the server. If this notification is the first such notification the server then creates a new group and places the client in that new group. In the event records are not available for multiple clients, all clients will be placed in the same newly created group by the server.

Notifying a client as to which multicast group the client has been assigned involves the following steps. The server sends or transmits a response to the client which includes data which informs the client as which multicast group the client has been assigned. The client then waits for further instructions from the server or from input from the user of the system.

Executing actions over the system involve the following steps. The server initiates an action which is to be performed by the clients assigned to a specific multicast group or groups and then sends or transmits the action to the specific multicast group or groups via the common network. The actions can be configure functions such as rebuilding the client operation system, control functions such as launching an application or maintenance functions such as checking the status of a client. Each active client listens to the transmission and only those clients which are members of the specific target multicast group or groups act on the action.

Other aspects and advantages of the present invention can be seen upon review of the figures, the detailed description and the claims which follow.

DETAILED DESCRIPTION OF THE PREFERRED EMBODIMENTS

Figure 1:
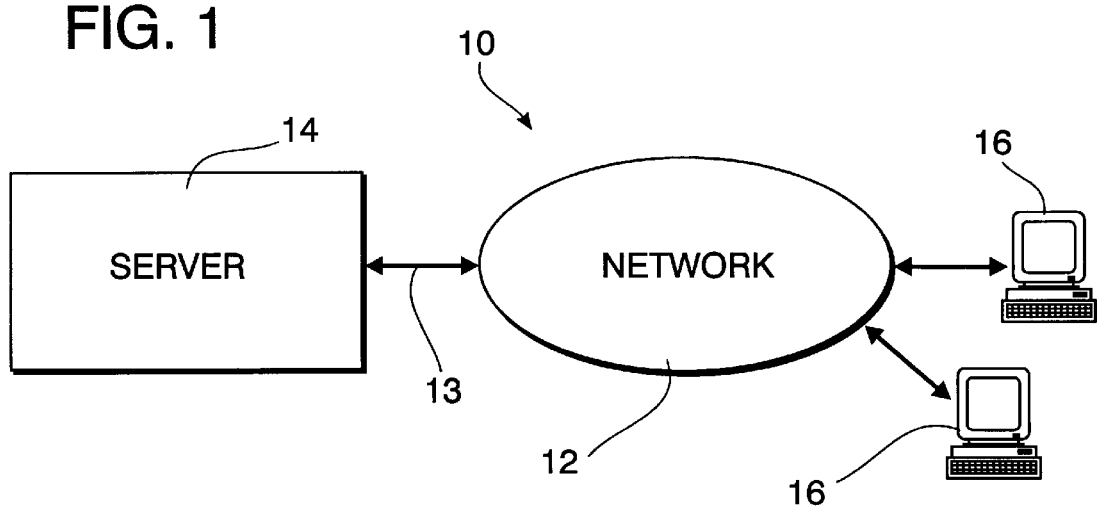
FIG. 1 depicts a multicast network system of the present invention.

FIG. 1 is an embodiment of the present invention depicting a multicast network system 10. The multicast network system 10 can be an open or closed system. An open system is one where the number of clients is unlimited. A closed system is one where the number of clients is finite. The multicast network system 10 provides data over network 12. Network 12 can be an Internet capable network such as an ATM or Ethernet network utilizing a conventional internet protocol (IP). A server 14 is bi-directionally coupled by wire 13 or a wireless system (not shown) to network 12 and provides continuous multicast of data wherein said data can include configure, control and maintenance packets as well as informational data such as statistical data. Also coupled by wire 13 or a wireless system (not shown) to network 12 are a plurality of clients 16. Each client 16 can be a standard computer having a central processing unit, memory, input means such as a keyboard, mouse, or touch screen and display device or similar device and configured to interact with server 14.

Figure 2:
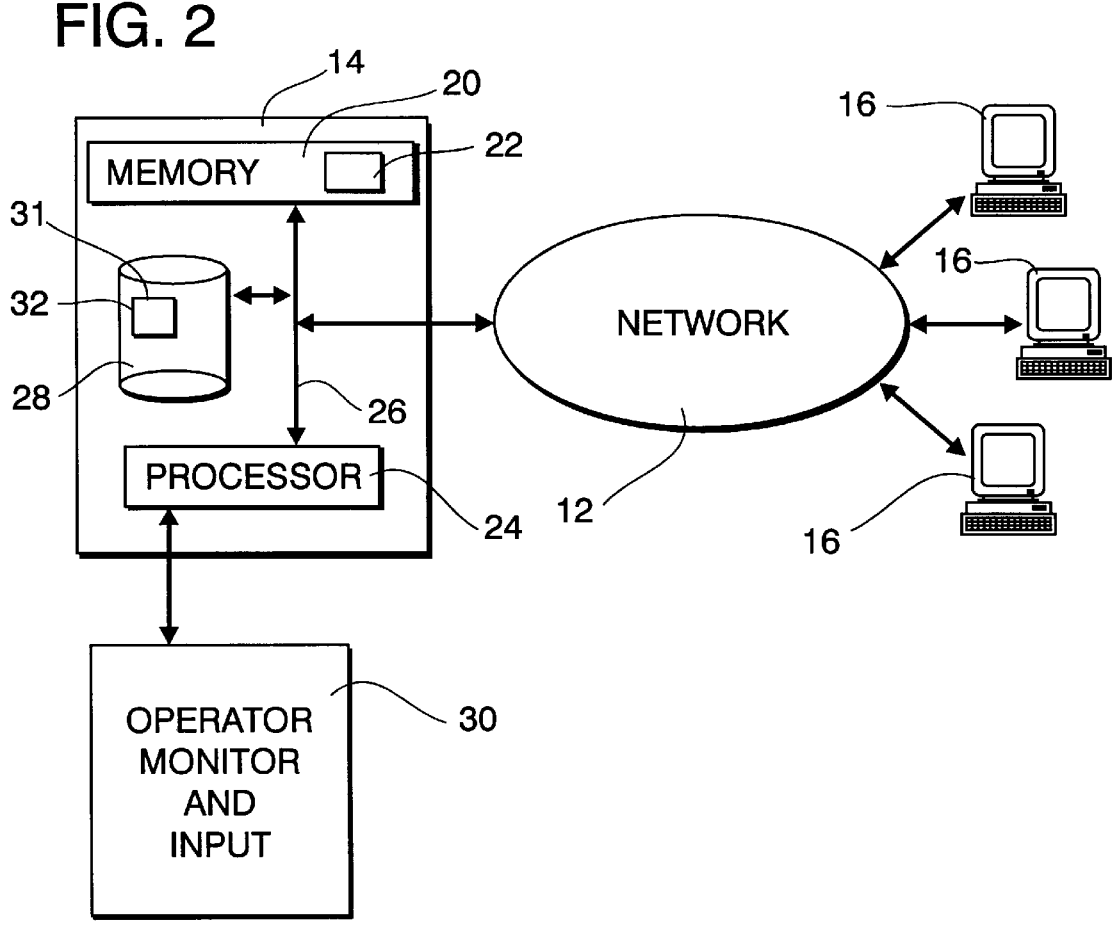
FIG. 2 shows schematically an overview of the present invention.

FIG. 2 is a block diagram illustrating server 14 of the multicast network system 10. Server 14 has a computer processor having a central processing unit 24 and a memory 20 connected by a bus 26. Memory 20 is relatively high speed machine readable medium and includes volatile memories such as random access memory (RAM) and non-volatile memory such as read only memory (ROM). Also connected to the bus 26 is a data storage device 28, and operator controls 30. Operator control 30 may take the form of a standard computer having a central processing unit, memory, input means such as a keyboard, mouse, or touch screen and display device or similar device and configured to interact with server 14. Also connected to bus 26 is network 12.

Computer software 22 can be stored in a software storage medium such as memory 20 and data storage device 28. Executable versions of computer software 22 can be read from a non-volatile storage medium such as data storage device 28 or memory 20. It can be loaded for execution directly onto volatile memory executed directly out of non-volatile memory or stored out of memory 20 prior to loading onto volatile memory for execution.

Data such as client informational records 32 can be stored in an organizational medium such as database 31. Database 31 can be stored in a data storage medium such as data storage device 28. Client informational records 32 contain information specific for each client such as the specific IP address of said client and the specific multicast groups to which said client should be assigned.

Figure 3:
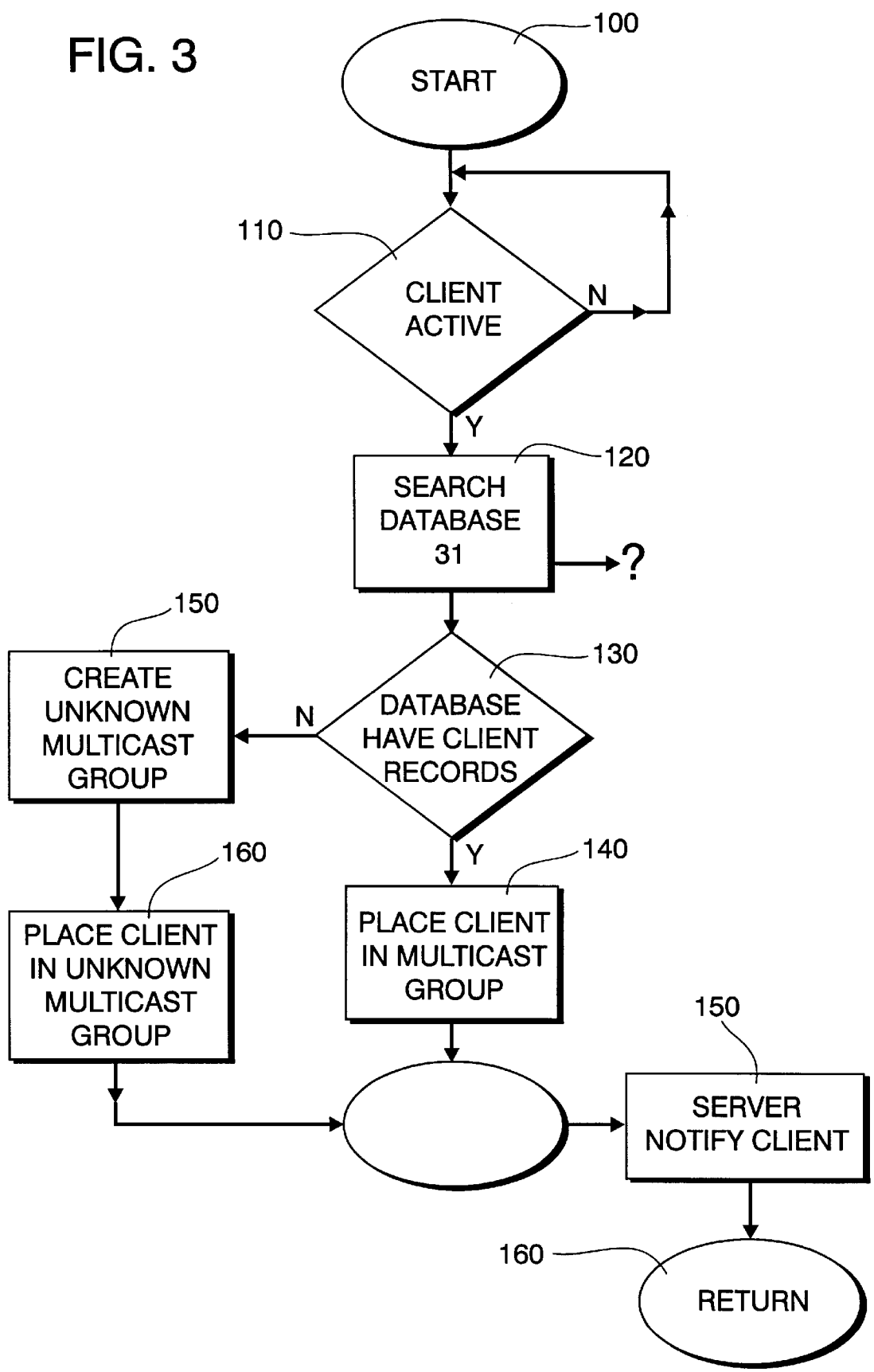
FIG. 3 illustrates a simplified flow chart of the preferred embodiment of the present invention illustrating the assignment of clients to specific multicast groups.

FIG. 3 is a simplified flow chart of the preferred embodiment of the present invention illustrating the assignment of clients to specific multicast groups. The flow chart begins at start step 100. Server 14 receives a notification from any client 16 that said client 16 is now active on network 12. At step 110 if no client is active, the multicast network system 10 returns to start step 100. If a client 16 is active, step 120 is performed by having server 14 search database 31 for specific client information records 32 regarding said client then advance to step 130. If database 31 does not contain any client information records 32 for said client 16 step 150 is executed and creates an unknown multicast group. Step 160 then places said client 16 in the unknown multicast group.

If, in step 130, database 31 contains client information records 32 for client 16, server 14 places said client 16 in their respective multicast groups pursuant to that client's 16 client information records 31. This step is illustrated at box 140. After client 16 has been assigned to a specific multicast group or groups, server 14 notifies client 16 as to the assignment as illustrated at box 150. The multicast network system 10 then returns (shown at return 160) to start step 100.

Figure 4:
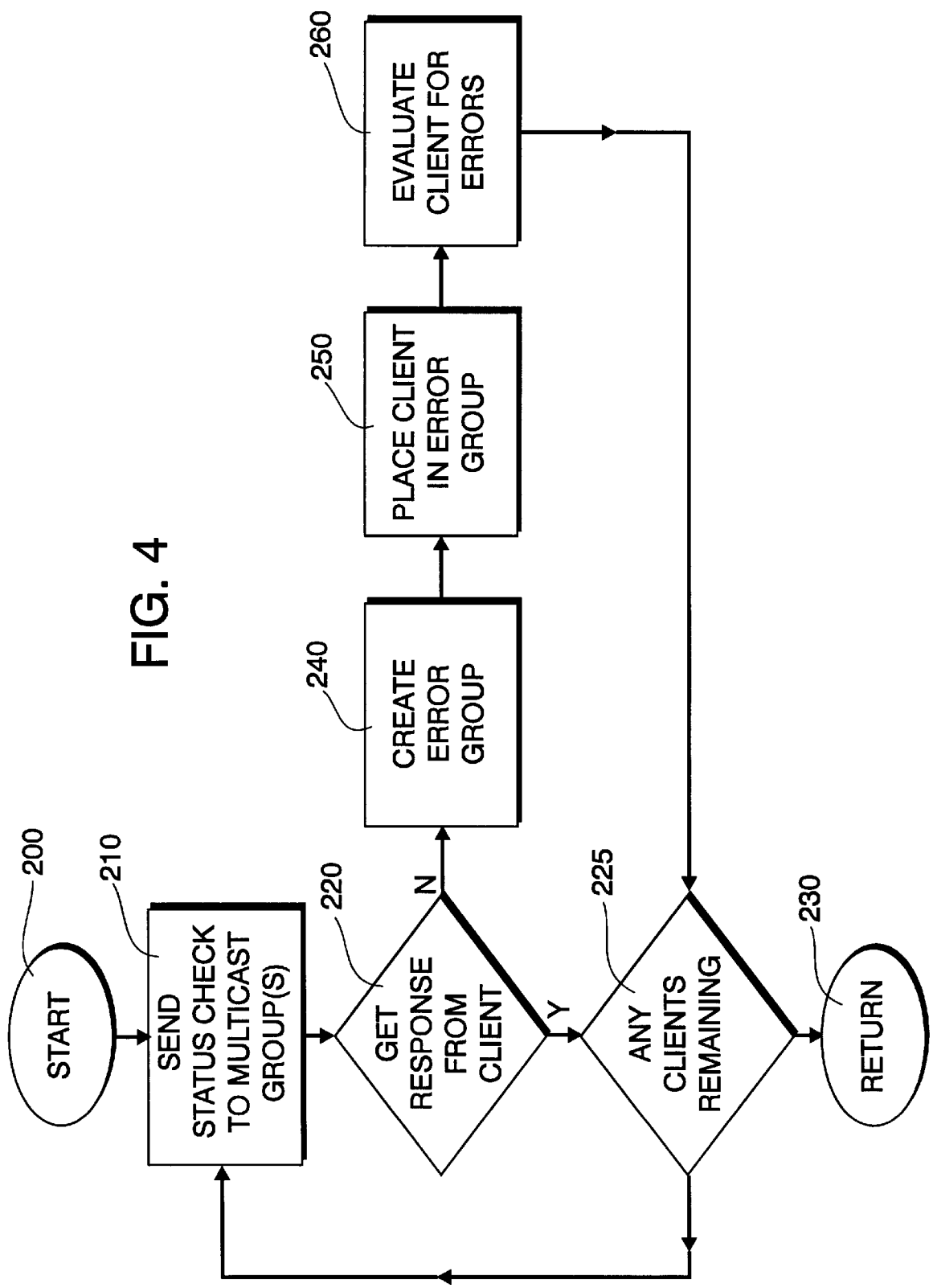
FIG. 4 illustrates a simplified flow chart of the present invention executing maintenance packets.

Referring now to FIG. 4, a simplified flow chart of multicast network system 10 executing maintenance packets is illustrated. Server 14 generates a maintenance data packet to determine the status of each active client 16 which is connected to the common network 12. The flow chart begins at start step 200. The server 14 generates and sends or transmits a maintenance data packet to a specific multicast group or groups of active clients 16 which is coupled to the common network 12 as shown in step 210.

If step 220 determines that a client has responded to the maintenance packet the flow chart proceeds to step 225. If, however, step 220 determines that a response has not been received, step 240 is performed by creating an error multicast group and being stored in memory 20. Step 250 then places the client in the error multicast group where step 260 can be performed such that the client in question is evaluated for errors. The flow chart then proceeds to step 225. In step 225, the previous steps are repeated until all clients of the specific multicast groups have either responded or been placed in an error group. Once all clients have been accounted for (seen at 230) return is made to the main processing loop.

Figure 5:
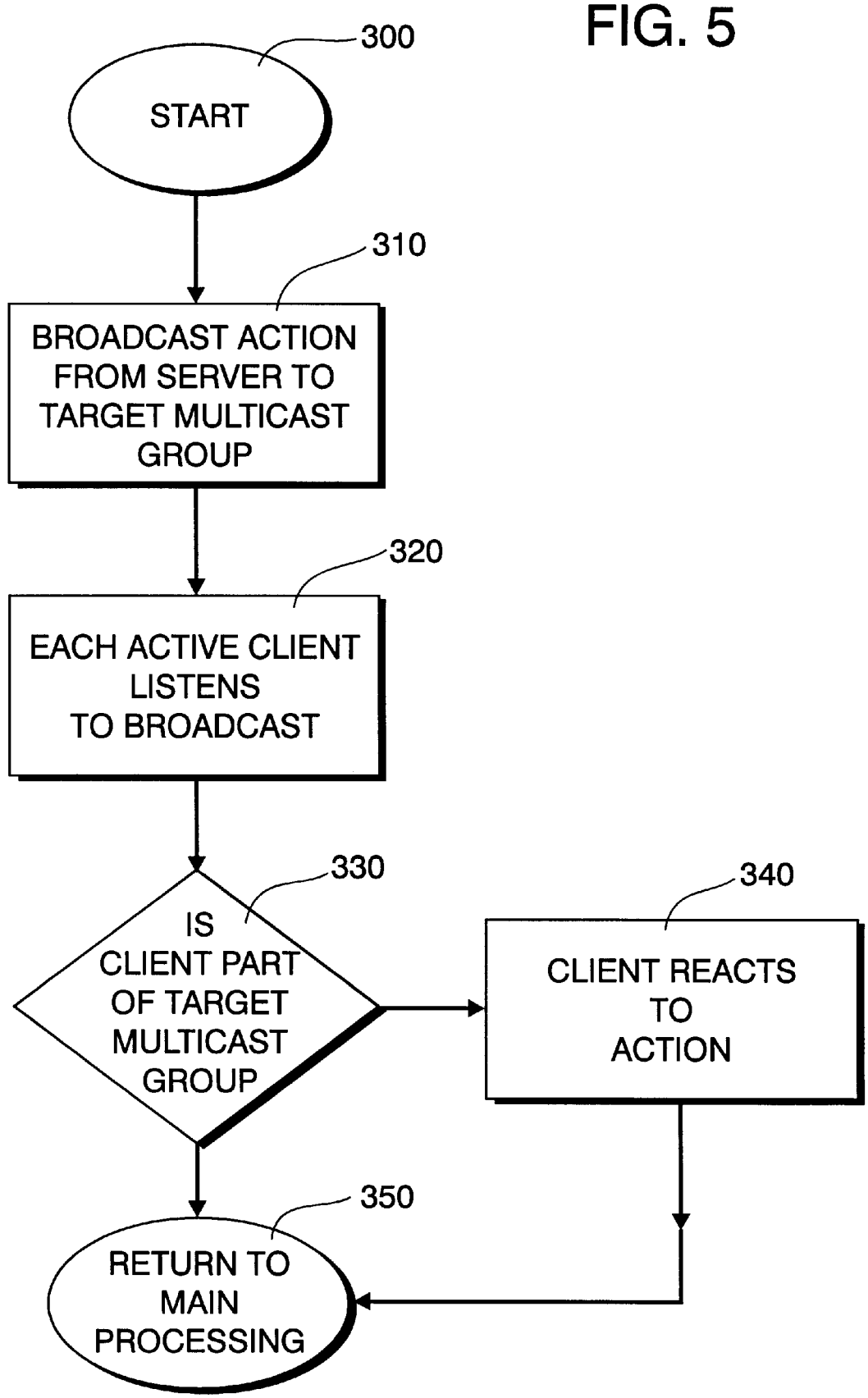
FIG. 5 illustrates a simplified flow chart of the present invention executing configure and control data packets.

Referring now to FIG. 5, simplified flow chart of the multicast network system 10 executing configure and control data packets is illustrated. Server 14 generates a configure or control packet and sends or transmits that packet across the common network 12 to a specific multicast group or groups wherein each client contained in the specific multicast group or groups then acts upon said packet. The flow chart begins at start step 300. In step 310, server 14 sends or transmits an action such as a configure packet or a control packet to a specific multicast group or groups. In step 320, each active client 16 listens to the broadcast. A determination is made as to whether a client is part of a target multicast group or groups, as illustrated in step 330. If a client is determined to part of a target multicast group or groups step 340 is performed wherein the client reacts to the requested action and then proceeds to step 350 wherein the flow chart returns to the main processing. If step 330 determines that a client is not part of a target multicast group or groups, step 350 is performed by returning to the main processing loop.

As one example of the invention, the present embodiment can be used as part of an interactive information system offering multimedia sports content. The information system can comprise a client\server network having a server bi-directionally coupled to a plurality of clients by a common network and deployed within a stadium or arena. Each client would be connected to a given stadium seat. The server could be in a remote location. The system would provide video, statistical data and other game enhancements to the sports fan.

In order to monitor each of the plurality of clients and to provide select information to a specific number of clients the system would need the ability to monitor each client while at the same time being able to place each client within a specific number of client groups. The present invention satisfies these needs. The present invention is able to place each client within a number of specific multicast groups while at the same time being able to allow for the monitoring of each client.

While the present invention has been particularly described in reference to FIGS. 1–5, it should be understood that the figures are for illustrative purposes and should not be taken as limitations on the invention.

Whereas, the present invention has been described in relation to the drawings attached hereto, it should be understood that other and further modifications, apart from those shown or suggested herein, may be made within the spirit and scope of this invention.

What is claimed is:

1. A multicast information system comprising:
   a server central processing unit system;
   a plurality of clients connected by a common network to the server system;
   wherein the server system includes:
   (a) a first computer processor;
   (b) a data storage; and
   (c) a first memory responsively coupled to the first computer processor and the data storage containing:
      (1) a set of computer instructions for assigning said plurality of clients into a specific multicast group;
      (2) a set of computer instructions for notifying said plurality of clients as to which multicast group each client has been assigned; and
      (3) a set of computer instructions for executing server initiated actions;
   wherein each said client device comprises:
   (a) a second computer processor;
   (b) input means;
   (c) a display unit; and
   (d) a second memory responsively coupled to the second computer processor containing:
      a set of computer instructions for interacting with said server system
      a set of computer instructions for notifying said server that said client is active within said network; and
      a set of computer instructions for receiving said assignment notification from said server.

2. A multicast information system comprising:
   a server central processing unit system;
   a plurality of clients connected by a common network to the system;
   wherein the server system includes:
   (a) a first computer processor;
   (b) a data storage for storing a first database wherein the first database stores specific information regarding each client; and
   (c) a first memory responsively coupled to the first computer processor and the data storage containing:
      (1) a set of computer instructions for receiving notification from a client computer that the client computer is active within the network;
      (2) a set of computer instructions for requesting specific information from the first database regarding said client computer;
      (3) a set of computer instructions for searching the first database for said specific information;
      (4) a set of computer instructions for sending said specific information to said first computer processor;
      (5) a set of computer instructions for assigning said client computer to a multicast group; and
      (6) a set of computer instructions for notifying said client computer of said assignment;
   wherein each said client device comprises:
   (a) a second computer processor;
   (b) input means;
   (c) a display unit; and
   (d) a second memory responsively coupled to the second computer processor containing:
      (1) a set of computer instructions for notifying said server that said client is active within said network and ready for assignment;
      (2) a set of computer instructions for receiving said assignment notification from said server.

3. The system of claim 2 wherein the first memory further comprises:
   (a) a set of computer instructions for assigning said client computer to a plurality of multicast groups.

4. The system of claim 2 wherein the first memory further comprises:
   (a) a set of computer instructions for creating an error multicast group;
   (b) a set of computer instruction for placing said client computer into said error multicast group if the first database contains no specific information regard said client computer.

5. A multicast communication method for multicasting information to and from a server central processing unit system to a plurality of clients, wherein the server system and each client is connected to a common network, wherein the server system includes data storage storing a first database having records of specific information regarding each client, a first computer processor and a first memory responsively coupled to the first database and first computer processor, wherein each client comprises a second computer processor, a display device, an input means and a second memory responsively coupled to the second processor, the display device and the input means, the method comprising the following steps:
   (a) transmitting notification from a client to the server system that said client is active with the network and ready for assignment;
   (b) assigning said client to a specific multicast group by said server; and
   (c) transmitting notification of said assignment from said server to said client.

6. The method of claim 5 wherein said client is assigned to a plurality of multicast groups.

7. The method of claim 5 comprising the additional steps of:
   (a) transmitting notification from a client to the server system that said client is active within the network;
   (b) receiving said notification by said server system;
   (c) requesting specific information by said server system which includes a plurality of multicast addresses of said client from the first database;
   (d) searching records of a first database for specific information of said client;
   (e) transmits said records from said first database to said server system;
   (f) assigning said client to specific multicast group by said server system;
   (g) contacting and informing said client of said assignment by said server system;
   (h) waiting for further instructions from server system.

8. The method of claim 7 further comprising the additional steps of:
   (a) if records do not exist, database transmits no information from said server;
   (b) if records do not exist, server system creates an unknown multicast group and assigns client to said unknown multicast group.

9. The method of claim 7 further comprising the steps of:
   (a) sending status requests from said server system to each active client computer;
   (b) if a client responds, said server system does not take any action;

(c) if a client does not respond, server system places said client into an error multicast group for evaluation.

10. A multicast communication method for multicasting information to and from a server central processing unit system to a plurality of clients, wherein the server system and each client is connected to a common network, wherein the server system includes data storage storing a first database having records of specific information regarding each client, a first computer processor and a first memory responsively coupled to the first database and first computer processor, wherein each client comprises a second computer processor, a display device, an input means and a second memory responsively coupled to the second processor, the display device and the input means, the method comprising the following steps:

(a) transmitting notification from a client to the server system that said client is active within the network;

(b) receiving said notification by said server system;

(c) requesting specific information by said server system which includes a plurality of multicast addresses of said client from the first database;

(d) searching records of a first database for specific information of said client;

(e) if records do not exist, database transmits no information from said server;

(f) if records do not exist, server system creates an unknown multicast group and assigns client to said unknown multicast group;

(g) if records do exist, transmits said records from said first database to said server system;

(h) assigning said client to specific multicast group by said server system;

(i) contacting and informing said client of said assignment by said server system;

(j) waiting for further instructions from server system.

11. The method of claim 10 further comprising the steps of:

(a) sending status requests from said server system to each active client computer;

(b) if a client responds, server system does not take any action;

(c) if a client does not respond, server system places said client into an error multicast group for evaluation.

12. The method of claim 10 wherein said client is assigned to a plurality of multicast groups.

13. A multicast communication method as set forth in claim 5 including the additional steps of said server initiating an action to be performed by said clients assigned to said specific group and said server transmitting said action to said specific group.

* * * * *